United States Patent [19]
Chang

[11] Patent Number: 4,795,233
[45] Date of Patent: Jan. 3, 1989

[54] FIBER OPTIC POLARIZER

[75] Inventor: Chin L. Chang, Phoenix, Ariz.

[73] Assignee: Honeywell Inc., Minneapolis, Minn.

[21] Appl. No.: 23,588

[22] Filed: Mar. 9, 1987

[51] Int. Cl.[4] .............................................. G02B 5/30
[52] U.S. Cl. ............................... 350/96.29; 350/96.15; 350/164; 350/395; 350/406
[58] Field of Search ............... 350/96.15, 96.16, 96.29, 350/96.30, 394, 395, 400, 401, 406, 162.17, 162.2, 163, 164

[56] References Cited

U.S. PATENT DOCUMENTS

| | | | |
|---|---|---|---|
| 4,575,187 | 3/1986 | Howard et al. | 350/96.33 |
| 4,589,728 | 5/1986 | Dyott et al. | 350/96.30 |
| 4,666,235 | 5/1987 | Pavlath | 350/96.29 X |
| 4,695,123 | 9/1987 | Chang et al. | 350/96.29 X |
| 4,725,113 | 2/1988 | Chang et al. | 350/96.15 |

Primary Examiner—John D. Lee
Assistant Examiner—Phan T. Heartney
Attorney, Agent, or Firm—Robert A. Pajak

[57] ABSTRACT

In the present invention, a multilayer stack of alternating layers of a metal and a dielectric is deposited directly onto the surface of an optical fiber that has been processed to remove the cladding from one side of the fiber. The multilayer metal-dielectric structure is constructed to give high birefringence and large differential attenuation for two orthogonal polarizations.

24 Claims, 4 Drawing Sheets

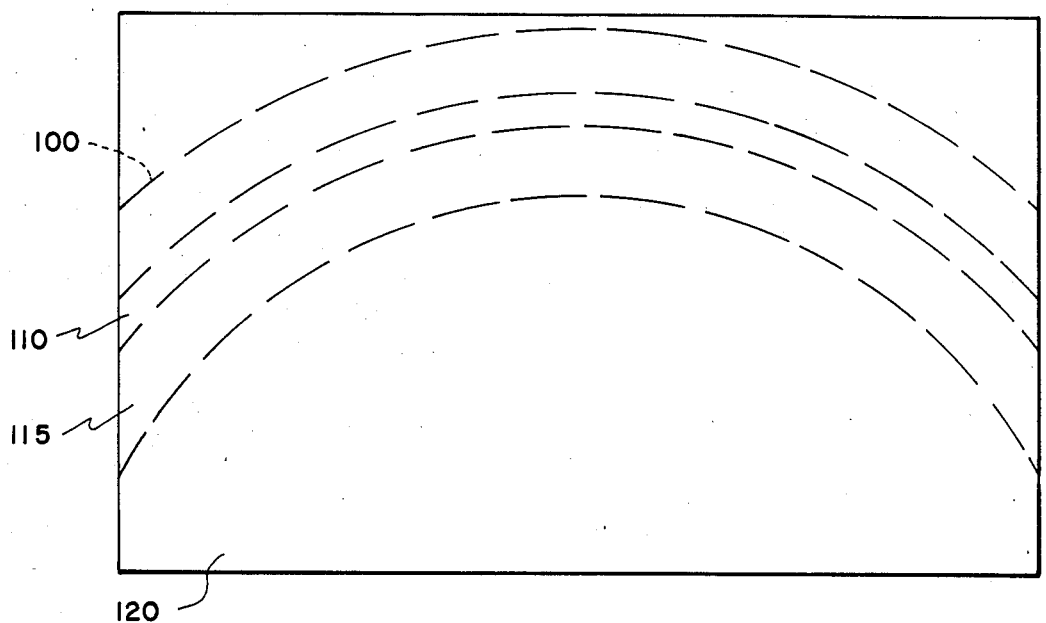
Fig._1
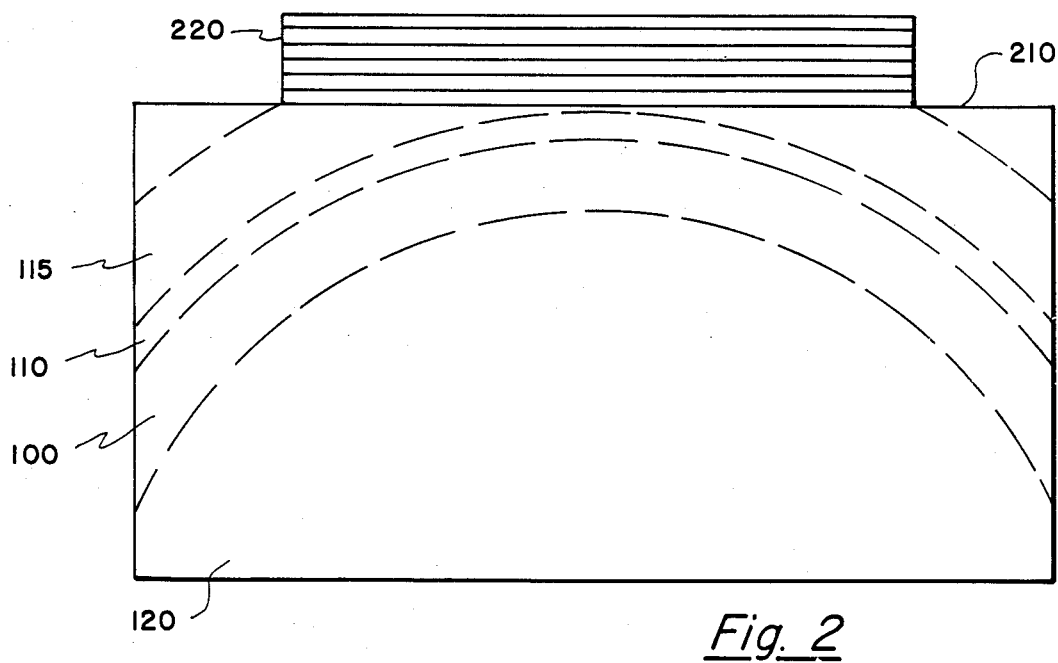
Fig._2

$d_2 \gg d_1$

FIBER OPTIC POLARIZER

FIELD OF INVENTION

The present invention generally relates to the field of fiber optics technology, and more particularly to fiber optic polarizers.

BACKGROUND OF INVENTION

Many fiber optic systems have operational characteristics that are highly dependent on the polarization of the light guided by the optical fiber. Such systems include optical angular rate sensors, herein referred to as fiber optic gyros, and interferometric sensors. Such sensors generally require that a single polarization state be maintained in order to achieve desired accuracy and performance characteristics.

Use of polarization-maintaining fibers to maintain single polarization state operation in fiber optic gyros have not proven to be adequate to achieve the purity of single polarization required for high performance goals. This is so since polarization noise directly impacts the bias and bias instability in fiber optic gyros. The bias and bias instability are generally attributed to polarizaiton coupling in the fiber loop in fiber optic gyros. Accordingly, there exists a need for a fiber optic polarizer having high extinction ratio and low insertion loss characteristics.

Several types of fiber optic polarizers which are based upon the interaction between the evanescent field of the guided wave and the material in the evanescent field region have been demonstrated. Polarizers of high extinction ratio and low loss are currently implemented using either birefringent crystal or metal films. In a publication entitled, "Single-Mode Fiber Optic Polarizer," Opt. Lett., Vol. 5, No. 11, pp. 479–481, 1980, by R. A. Bergh, H. C. Lefevre, and H.J. Shaw, a crystal polarizer was shown incorporating a birefringent crystal. The crystal was placed on a length of fiber from which a portion of cladding had been removed. The evanescent field of the light guided by the fiber interacts with the birefringent crystal causing the light of unwanted polarization to couple out of the fiber and into the birefringent medium where it is no longer guided by the fiber. However, the light of desired polarization is unaffected by the birefringent crystal and remains guided by the fiber.

Metal-clad fiber optic polarizers based on either the differential attenuation of the two polarization modes or the cut-off of the $TE_O$ mode have been described and demonstrated in previous work as described in publications entitled "Fabricaton of Single-Mode Fiber-Type Polarizer," Opt. Lett., Vol. 8, No. 2, pp. 124–126, 1983 by T. Hosaka, K. Okamoto and T. Edahiro, and "Metal-Clad Fiber-Optic Polarizer," Opt. Lett., Vol. 11, No. 6, pp. 386–388, 1986 by J.R. Feth and C.L. Chang, respectively. All of the above mentioned references being incorporated herein by reference.

In addition to low loss and high extinction ratio, an environmentally stable and wavelength-independent polarizer is desired for practical applications. The crystal polarizer is inherently very sensitive to the temperature variation because the refractive index changes with temperature. Furthermore, the birefringent crystal should be either mechanically or adhesively bonded to the optical fiber where the cladding material has been removed. The resultant device thus suffers very severe mechanical and thermal instabilities. The metal-clad fiber polarizer based upon the differential attenuation of the two polarizations requires a very thick metal film which is prepared very close to the fiber core. High extinction ratio and low loss cannot be achieved simultaneously with this type of device. The other metal clad polarizer that utilizes a very thin metal film could be sensitive to the operating wavelength, although high extinction ratio and low insertion loss can be obtained.

BRIEF DESCRIPTION OF THE INVENTION

An object of the present invention is to provide a fiber optic polarizer that is capable of producing linearly polarized light in an optical fber with low insertion loss and high extinction ratio. Another object of the invention is to provide a polarizer which is almost wavelength-independent and environmentally, thermally and mechanically stable. Another object of the invention is to provide a polarizer which is ideally suited for applications in fiber optic gyros.

In the present invention, a multilayer stack of alternating layers of a metal and a dielectric is deposited directly onto the surface of an optical fiber that has been processed to remove the cladding from one side of the fiber. The multilayer metal-dielectric structure is constructed to give high birefringence and large differential attenuation for two orthogonal polarizations.

DETAILED DESCRIPTION OF FIGURES

FIG. 1 is a side view of an optical fiber bound in a substrate.

FIG. 2 is a side view of the fiber optic polarizer in accordance with present invention.

DETAILED DESCRIPTION OF THE INVENTION

Figure 3:
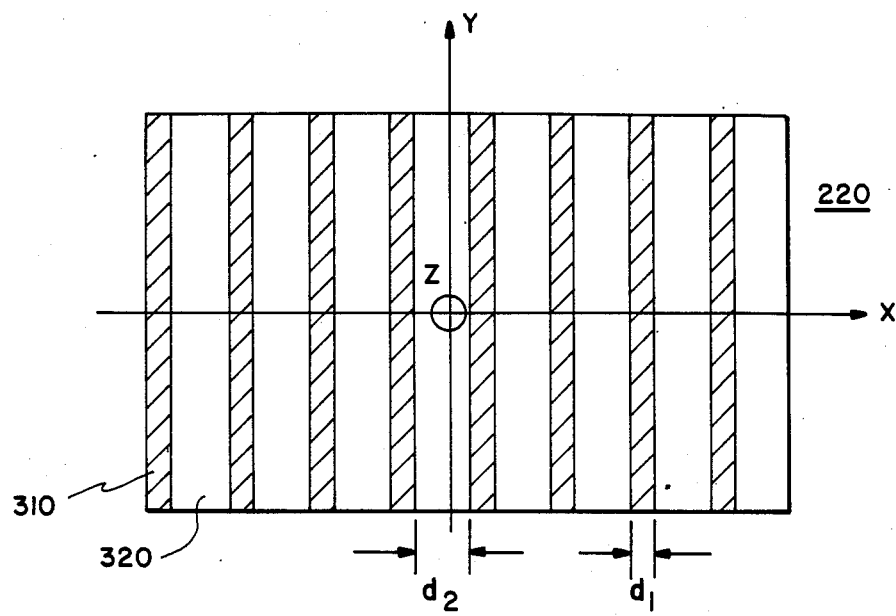
FIG. 3 shows the cross section of the multilayer structure in accordance with present invention.

FIG. 1 shows a side view of the fiber optic polarizer bounded in a substrate for subsequent processing in accordance with the present invention. Shown in FIG. 1 is an optical fiber 100 having a central core 110 and cladding 115. The fiber 100 is bounded in a substrate 120. The optical fiber 100 is preferably a polarization maintaining fiber. Substrate 120 is intended to be a mechanically and thermally stable substrate such as glass, quartz, fused silica, and the like. The optical fiber 100 is bounded in substrate 120 with a selected radius of curvature.

In order to remove a selected portion of the cladding 115 of optical fiber 100, the substrate is ground and polished to expose the evanescent field of the optical core 110 at the grounded and polished surface 210 as substantially illustrated in FIG. 2. The substrate surface 210 is substantially perpendicular to the radius of curvature of the fiber. Substrate 120 and fiber 100 are ground and polished to the extent to provide a surface for depositing a multilayer stack 220 of thin film layers. Substrate 120 and fiber 100 are ground and polished to the extent that the evanescent field of a guided-wave passing through fiber 100 and penetrating the cladding region 115 can interact with the multilayer stack 220.

Now referring to FIG. 3, there shown is the multilayer structure 220 in accordance with the present invention. The stack 220 is illustrated having alternating thin layers of two distinct materials designated in FIG. 3 by numerals 310 and 320. Thin film layer 310 is intended to have a layer thickness $d_1$, and thin film layer 320 is intended to have a layer thickness $d_2$. In the preferred embodiment of the invention, the multilayer stack is comprised of repeating pairs of the two thin film layers 310 and 320 so as to provide a "periodic" structure of the two thin film layers.

Preferably, thin film layer 310 is comprised of a metal film material, and thin film layer 320 is comprised of a dielectric film material. Successful results have been achieved by using alternating layers of aluminum and silicon dioxide for the metal-dielectric thin film layer combination. The number of the periodic layers of dielectric-metal structure is a matter of design choice. However, good results have been obtained using 70 layers, that is 35 pairs of layers of the metal-dielectric pair.

The total film thickness of the dielectric-metal pair, the sum of $d^1$ and $d^2$, should be smaller than the wavelength of operation. Furthermore, the metal thickness should be much smaller than dielectric thickness to ensure low insertion loss. Good results have been obtained using a thin film layer of metal in the order 100 to 200 angstroms thick, and the dielectric layer in the order of 3000 angstroms thick. The thin film layers 310 and 320, which comprise stack 220 may be deposited on substrate surface 210 by a variety of deposition techniques, including among others vacuum sputtered deposition.

Figure 4:
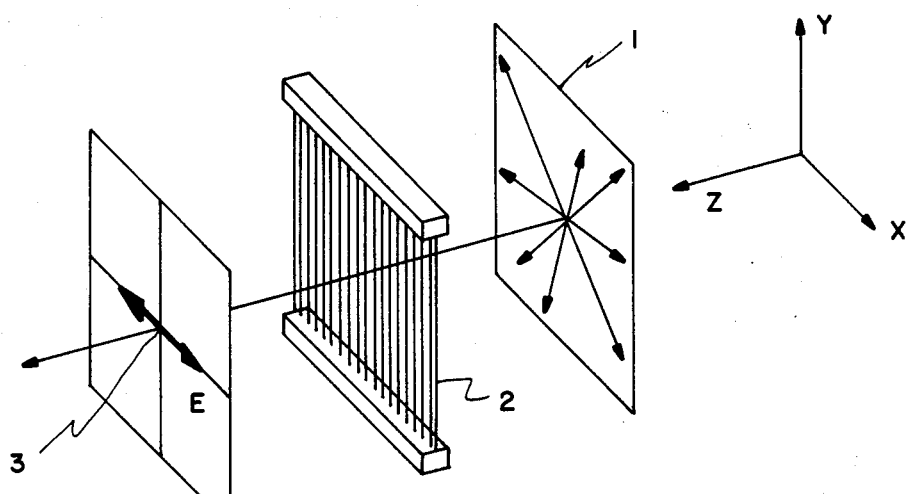
FIG. 4 illustrates a wire grid polarizer.

In understanding the present invention, an analog can be drawn between the periodic metal-dielectric layers that are used in the evanescent region of an optical fiber of the present nvention, and parallel plate or wire grid polarizers for microwaves and far-infrared waves, respectively. The simplest device of this sort is shown schematically in FIG. 4. Consider an unpolarized electro-magnetic wave 1 impinging on the grid 2 from the right. The electric field can be resolved into two orthogonal components: in this case one was chosen to be parallel to the wires and the other one perpendicular to them. The Y-component of the field parallel with the wires drives the conduction electrons along the length of each wire, thus generating a current. The electrons in turn collide with lattice atoms imparting energy to them and thereby heating the wires. In this manner, energy is transferred from the field to the grid. In addition, electrons accelerated along the Y-axis radiate in both forward and backward directions. As should be expected, the incident wave tends to be canceled by the wave radiated in the forward direction, resulting in little or no transmission of the Y-component of the field. The radiation wave propagating in the backward direction simply appears as a reflected wave. In contrast, the electrons are not free to move very far in the X-direction, and the corresponding field component of the wave perpendicular to the wires is essentially unaltered as it propagates through the grid 3.

The multilayer metal-dielectric stack structure of FIGS. 2 and 3 is characterized by high birefringence and large differential attenuations for the two polarizations. The loss for the desired polarization is very low, so it is ideally suited to the applications as a polarization filtering device. In the particular configuration depicted in FIG. 2, horizontally polarized light that is parallel to the metal-dielectric interface will suffer very high loss. Vertically polarized light will propagate through the interaction region with reasonably low loss. For optimum performance, the period of the multilayer stack should be smaller than the optical wavelength, and the thickness of the metal layer needs to be much smaller than the thickness of the dielectric layer.

The multilayer structure of FIGS. 2 and 3 behaves in a manner as will now be described. As the guided wave propagates through the interaction region of fiber 100 and stack 220 where the evanescent field penetrates into the multilayer structure, (i) horizontally polarized light that is parallel to the stack fiber interface (i.e. surface 210) will suffer very high loss primarily due to absorption loss, and (ii) vertically polarized light will propagate through the interaction region with reasonably low loss. This is primarily due to the large differential attenuation Moreover, large birefringence associated with the multilayer structure can alter the modal field patterns such that the overlap between the evanescent field and the multilayer structure can be enhanced for the absorption mode. This will improve the extinction ratio.

Figure 5:
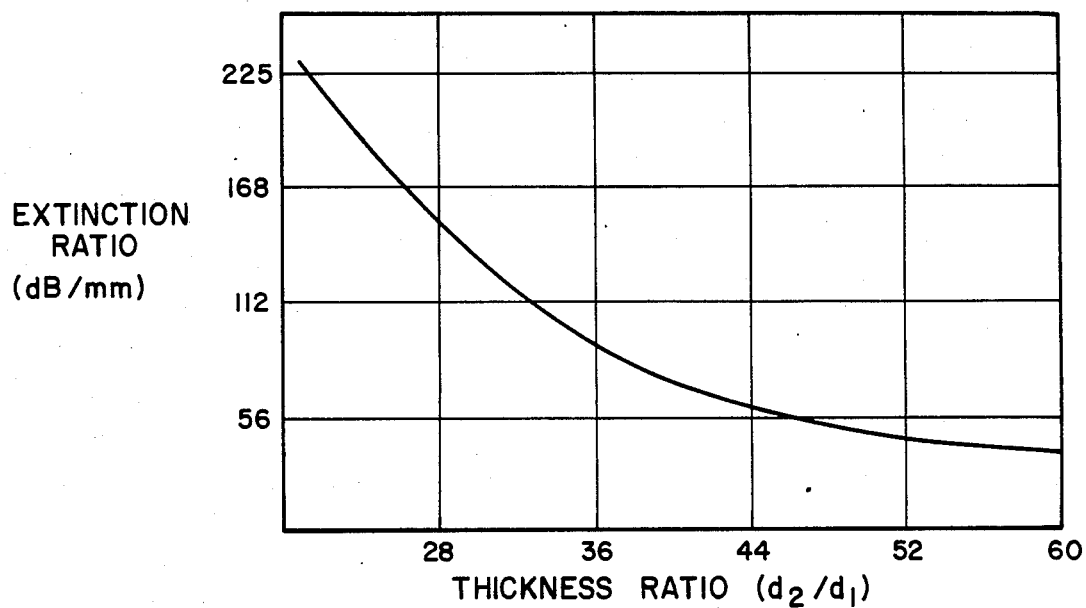
FIG. 5 shows the theoretical extinction ratio per unit length versus the thickness ratio of the metal/dielectric film of the present invention.
Figure 6:
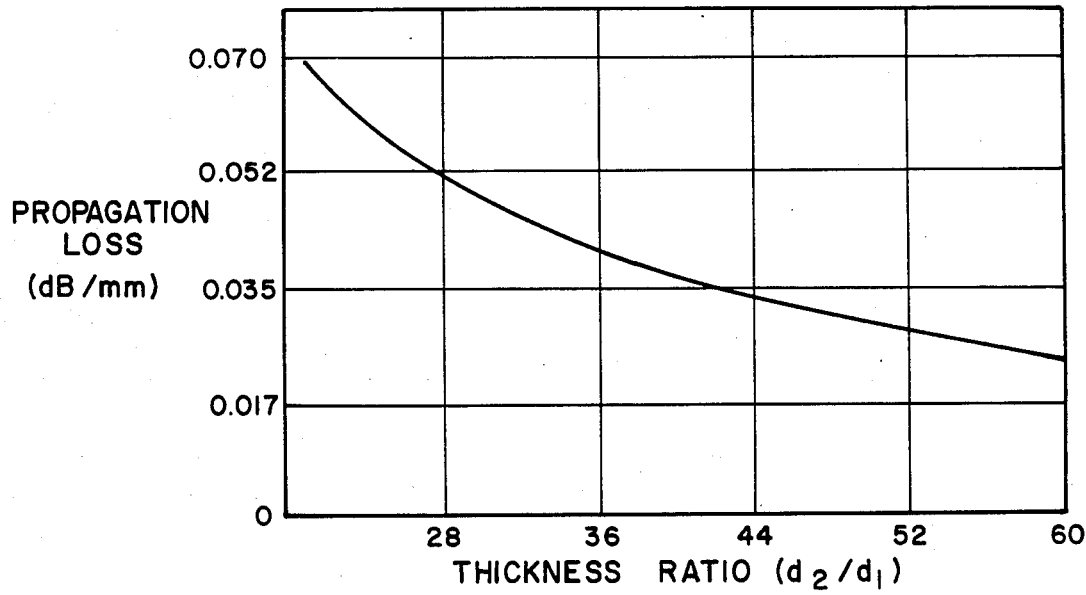
FIG. 6 shows the theoretical loss per unit length versus the thickness ratio of the metal/dielectric film of the present invention.

The multilayer metal-dielectric structure, shown in FIG. 3, has been theoreticaly analyzed for optimizing the polarizer design. FIGS. 5 and 6 show theoretical predictions for the extinction ratio and the propagation loss, respectively, of the preferential transmitting polarization versus the thickness ratio between dielectric and metal films. The propagation length in the calculation was chosen to be 1 mm. Very high extinction ratios and low propagation loss can be obtained when light polarized in the X-direction propagates through small distances along the Z-axis. As a result, a fiber optic polarizer with high extinction ratio and low loss can be constructed when this multilayer structure is applied in the evanescent field region of the guided wave.

It should be noted that the extinction ratio of the device is determined by the amount of optical field in the guided-wave that penetrates into the multilayer cladding. As can be readily appreciated by those skilled in that art, the extinction ratio, therefore is dependent somewhat upon the radius of curvature and the amount of polishing of the substrate surface to penetrate the optical fiber and expose the fiber core to the cladding. Further, the amount of optical field in the guided-wave which penetrates into the periodic layer cladding can be controlled to some extent by applying a buffer layer between the dielectric-metal structure 220 and the surface 210. The buffer layer should be selected to have an appropriate refractive index and thickness. These selected characteristics can affect the percentage of power penetrating into the metal-dielectric cladding. For example, the buffer layer may be comprised of magnesium-floride having a thickness in the order of 100 angstroms. The performance of the polarizer of the present invention can also be controlled by the selection of the metal and dielectric materials such that the effective index of refraction of the unwanted polarization will match the fiber very well, while the effective index or the desired polarization will not match that of the fiber. Thus, device of low loss and high extinction ratio can be obtained.

Figure 7:
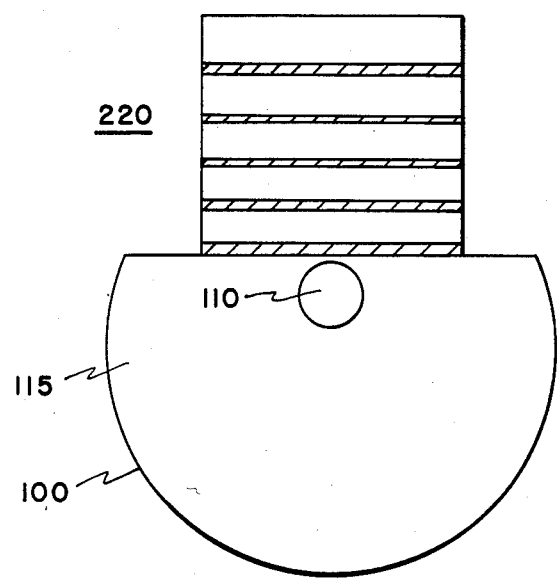
FIG. 7 shows a side view of an optical fiber of an alternative embodiment of the invention.

FIG. 7 illustrates an alternative embodiment of the present invention. Briefly, FIG. 7 illustrates the multilayer stack 220 deposited on a fiber 100 having a portion of the cladding removed. The fiber is ground in a manner as already described to permit interaction of the wave with the multilayer stack in the evanescent field region of a guide-wave. The stack 220 is deposited directly on the ground fiber without the benefit of a substrate. The polarizing behavior of the structure of FIG. 7 is substantailly the same as already described.

While only certain particular embodiments have been described in detailed herein, it will be apparent to those familiar with the art that certain changes and modifications can be made without departing from the ture spirit and scope of the invention as defined by the following claims. It should be recognized there exists a wide variation of materials for the metal-dielectric structure, and only the preferred embodiments have been described herein.

It should be further recognized that alternating layers of two dielectric materials, e.g. $Al_2O_3$ and $SiO_2$, is also within the scope of the present invention. Although a structure comprised of these two materials may function and is within the scope of the present invention, the metal-dielectric combination is preferable.

I claim:

1. A fiber optic polarizer comprising:
   a substrate;
   an optical fiber bound in said substrate, said fiber having a selected portion thereof coplanar with a first surface of said substrate;
   a multilayer stack of at least two alternating first and second layers in which said first layer is of a first material and said second layer is of a second material, and in which said alternating layers have a selected thickness, and in which said stack is in optical contact with said selected portion of said fiber to permit waves passing through said fiber to interact with said multilayer stack; and
   said first and second materials are comprised of a dielectric material and a metal, respectively, and said first and second layer materials and thickness are selected to permit differential attenuation for two orthogonal polarizations of light passing through said fiber.

2. The polarizer of claim 1 wherein the thickness of the metal layer is much less than the thickness of the dielectric layer.

3. The polarizer of claim 1 wherein said first and second alternating layers are comprised of aluminum and silicon dioxide, respectively.

4. The polarizer of claim 1 wherein the combined thickness of the dielectric layer and the metallic layer is less than the wavelength of the light passing through said optical fiber.

5. The polarizer of claim 1 wherein said optical fiber is bound in said substrate with a selected radius of curvature, and said first surface of said substrate is substantially perpendicular to the radius of curvature of said optical fiber.

6. The polarizer of claim 1 including a buffer layer interposed between said first surface and said stack, said buffer layer being of a selected material having a selected refractive index and thickness to permit enhanced power penetration of waves into said stack.

7. The polarizer of claim 1 wherein said substrate is comprised of fused silica.

8. The polarizer of claim 1 wherein said substrate is comprised of a mechanically and thermally stable material.

9. The polarizer of claim 1 wherein each layer of the same material is of substantially the same thickness.

10. The polarizer of claim 1 wherein said selected portion of said fiber is in optical contact with said stack sufficient to permit the evanescent field of a guided-wave passing through said fiber to interact with said stack.

11. The polarizer of claim 1 further comprising a buffer layer interposed between said stack and said selected fiber portion for limiting the amount of optical field of a wave passing through said fiber which can interact with said stack.

12. A fiber optic polarizer comprising an optical fiber having a core bounded by a cladding, and a portion of said cladding being comprised of a stack of alternating first and second layers comprised of a dielectric material and a metal, respectively, and said first and second layer materials and thickness are selected to permit differential attenuation for two orthogonal polarizations of light passing through said fiber.

13. The polarizer of claim 12 wherein the thickness of the metal is much less than the thickness of the dielectric.

14. The polarizer of claim 12 wherein said alternating layers are comprised of aluminum and silicon dioxide, respectively.

15. The polarizer of claim 14 wherein the combined thickness of the electric layer and the metallic layer are less than the wavelength of the light passing through said optical fiber.

16. The polarizer of claim 12 wherein said optical fiber is bound in said substrate with a selected radius of curvature, and said first surface of said substrate is substantially perpendicular to the radius of curvature of said optical fiber.

17. The polarizer of claim 12 wherein said cladding comprised of said stack is sufficient to permit the evanescent field of a guided-wave passing through said fiber to interact with said stack.

18. The polarizer of claim 12 further comprising a buffer layer interposed between said stack and said selected fiber portion for limiting the amount of optical field of a wave passing through said fiber which can interact with said stack.

19. A method of making a fiber optic polarizer comprising;
   bounding an optical fiber in a substrate such that said fiber is curved and has a selected radius of curvature.
   grinding said substrate and said optical fiber to provide a substrate surface which is coplanar with a selected portion of said optical fiber;
   depositing on said selected portion a multilayer stack of alternating first and second layers comprised of a metal and a dielectric, respectively and in which each of said alternating layers have a selected thickness.

20. The method of claim 19 further comprising the step of depositing a buffer layer of a third material of a selected thickness interposed between central core portion and said multilayer stack.

21. A fiber optic polarizer for receiving an optical input signal having an arbitrary polarization and providing an optical output signal having substantially only a single selected polarization, comprising:
   a length of optical fiber having a core and a cladding surrounding the core;

a multilayer stack of at least two alternating first and second layers in which said first layer is of a first material and said second layer is of a second material, and in which said alternating layers have a selected thickness, and in which said stack is in optical communication with said core to permit waves passing through said fiber to interact with said multilayer stack; and said first and second materials are comprised of a dielectric material and a metal, respectively, and said first and second layer materials and thickness are selected to permit differential attenuation for two orthogonal polarizations of said optical input signal passing through said fiber.

22. The polarizer of claim 21 wherein the thickness of the metal layer is much less than the thickness of the dielectric layer.

23. A polarizer for receiving an optical input signal having an arbitrary polariztion and providing an optical output signal having substantially only a single selected polarization, comprising:

an optical waveguide having a core;

a multilayer stack of at least two alternating first and second layers in which said first layer is of a first material and said second layer is of a second material, and in which said alternating layers have a selected thickness, and in which said stack is in optical communication with said core to permit waves passing through said waveguide to interact with said multilayer stack; and said first and second materials are comprised of a dielectric material and a metal, respectively, and said first and second layer materials and thickness are selected to permit differential attenuation for two orthogonal polarizations of said optical input signal passing through said waveguide.

24. The polarizer of claim 23 wherein the thickness of the metal layer is much less than the thickness of the dielectric layer.

* * * * *